US010284465B2

(12) United States Patent
Haramaty et al.

(10) Patent No.: US 10,284,465 B2
(45) Date of Patent: May 7, 2019

(54) EFFICIENT ALGORITHMIC FORWARDING IN FAT-TREE NETWORKS (71) Applicant: Mellanox Technologies TLV Ltd., Raanana (IL)

(72) Inventors: Zachy Haramaty, Hemed (IL); Eitan Zahavi, Zichron Yaakov (IL); Itamar Rabenstein, Petach Tikva (IL)

(73) Assignee: Mellanox Technologies TLV Ltd., Raanana (IL)

( * ) Notice: Subject to any disclaimer, the term of this patent is extended or adjusted under 35 U.S.C. 154(b) by 78 days.

(21) Appl. No.: 14/979,667

(22) Filed: Dec. 28, 2015

(65) Prior Publication Data
US 2017/0187614 A1    Jun. 29, 2017

(51) Int. Cl.
H04L 12/753 (2013.01)
H04L 12/46 (2006.01)
H04L 12/741 (2013.01)
H04L 12/935 (2013.01)
H04L 12/44 (2006.01)

(52) U.S. Cl.
CPC .............. *H04L 45/48* (2013.01); *H04L 12/44* (2013.01); *H04L 12/4625* (2013.01); *H04L 45/74* (2013.01); *H04L 49/3045* (2013.01)

(58) Field of Classification Search
CPC ..... H04L 45/48; H04L 12/44; H04L 12/4625; H04L 45/74; H04L 49/3045
See application file for complete search history.

(56) References Cited

U.S. PATENT DOCUMENTS

| 7,289,513 | B1 * | 10/2007 | Medved | H04L 45/22 370/244 |
| 7,912,091 | B1 * | 3/2011 | Krishnan | H04L 45/02 370/490 |
| 8,000,336 | B2 | 8/2011 | Harel | |
| 8,085,659 | B2 | 12/2011 | Duato Marin et al. | |
| 8,170,040 | B2 | 5/2012 | Konda | |

(Continued)

OTHER PUBLICATIONS

Leiserson., "Fat-Trees: Universal Networks for Hardware Efficient Supercomputing", IEEE Transactions on Computers, vol. C-34, No. 10, pp. 892-901, Oct. 1985.

(Continued)

*Primary Examiner* — Brandon M Renner
*Assistant Examiner* — Jay L Vogel
(74) *Attorney, Agent, or Firm* — Kligler & Associates (57) ABSTRACT A switch includes multiple physical ports and forwarding circuitry. The physical ports are configured to receive and send packets over a network. The forwarding circuitry is configured to assign first port numbers to the physical ports, and second port numbers to temporary ports defined in addition to the physical ports, to receive a packet having a destination address via a physical port, to select, based on the destination address, an egress port number for the packet from among the first and second port numbers, to forward the packet to a physical port corresponding to the egress port number if the egress port number is one of the first port numbers, and, if the egress port number is one of the second port numbers, to map a temporary port associated with the egress port number to a mapped physical port and to forward the packet to the mapped physical port.

18 Claims, 4 Drawing Sheets

(56) References Cited

U.S. PATENT DOCUMENTS

| | | | |
|---|---|---|---|
| 8,289,958 B1* | 10/2012 | Narayanan | H04L 12/66 370/352 |
| 8,570,865 B2 | 10/2013 | Goldenberg et al. | |
| 8,761,166 B2 | 6/2014 | Scott et al. | |
| 9,014,201 B2 | 4/2015 | Bogdanski | |
| 2005/0050352 A1* | 3/2005 | Narayanaswami | H04L 63/08 726/4 |
| 2007/0226549 A1* | 9/2007 | Anastasiadis | H04L 49/555 714/699 |
| 2008/0049778 A1* | 2/2008 | Yano | H04L 45/245 370/422 |
| 2008/0101353 A1* | 5/2008 | Streijl | H04L 29/12283 370/389 |
| 2008/0285562 A1* | 11/2008 | Scott | G06F 15/17362 370/392 |
| 2010/0064031 A1* | 3/2010 | Wright | H04L 29/12066 709/220 |
| 2010/0077079 A1* | 3/2010 | Xu | G06F 11/2294 709/226 |
| 2010/0106866 A1* | 4/2010 | Aybay | H04L 47/10 710/29 |
| 2011/0238793 A1* | 9/2011 | Bedare | H04L 45/586 709/220 |
| 2012/0020356 A1* | 1/2012 | Ohno | H04L 45/16 370/390 |
| 2012/0300669 A1 | 11/2012 | Zahavi | |
| 2014/0247754 A1* | 9/2014 | Venkata | H04L 45/48 370/256 |
| 2014/0314099 A1 | 10/2014 | Dress | |
| 2014/0341568 A1* | 11/2014 | Zhang | H04J 14/0212 398/34 |
| 2015/0381386 A1* | 12/2015 | Sigoure | H04L 12/4645 370/392 |

OTHER PUBLICATIONS

Öhring et al., "On Generalized Fat Trees", Proceedings of the 9th International Symposium on Parallel Processing, pp. 37-44, year 1995.

Gomez et al., "Deterministic versus Adaptive Routing in Fat-Trees", IEEE International Symposium on Parallel and Distributed Processing, pp. 1-8, 2007.

Lin et al., "A multiple LID routing scheme for fat-tree-based InfiniBand networks," Proceedings of the 18th Symposium on Parallel and Distributed Processing, 10 pages, 2004.

Zahavi, "D-Mod-K Routing Providing Non-Blocking Traffic for Shift Permutations on Real Life Fat Trees," CCIT Technical Report #776, Technion—Israel Institute of Technology, 8 pages, Sep. 2010.

Minkenberg et al., "Multistage Interconnection Networks for Data Centers", Bidirectional Fat Tree Construction and Routing for IEEE 802.1au, IBM Research GmbH, 9 pages, Jul. 2, 2007.

* cited by examiner

EFFICIENT ALGORITHMIC FORWARDING IN FAT-TREE NETWORKS

FIELD OF THE INVENTION

The present invention relates generally to communication networks, and particularly to methods and systems for algorithmic forwarding in Fat-Tree networks.

BACKGROUND OF THE INVENTION

Various topologies are known in the art for connecting network switches to one another in packet networks. An example topology is referred to as Fat-Tree topology. Fat-Tree networks were originally defined by Leiserson in "Fat-Trees: Universal Networks for Hardware Efficient Supercomputing," IEEE Transactions on Computers, volume C-34, no. 10, 1985, pages 892-901, which is incorporated herein by reference.

Fat-Tree topologies having special properties are sometimes classified into families, such as k-ary n-trees, Generalized Fat-Trees (GFT) and Extended GFTs (EGFT). For example, Öhring et al. define extended and generalized Fat Trees, in "On Generalized Fat Trees," Proceedings of the $9^{th}$ International Symposium on Parallel Processing, 1995, page 37, which is incorporated herein by reference.

Packet routing in Fat-Tree networks is addressed, for example, by Gomez et al., in "Deterministic versus Adaptive Routing in Fat-Trees," IEEE International Symposium on Parallel and Distributed Processing, Long Beach, Calif., USA, 2007, pages 1-8; by Xuan-Yi Lin et al., in "A multiple LID routing scheme for fat-tree-based InfiniBand networks," Proceedings of the $18^{th}$ Symposium on Parallel and Distributed Processing, 2004; and by Zahavi, in "D-Mod-K Routing Providing Non-Blocking Traffic for Shift Permutations on Real Life Fat Trees," CCIT Technical Report #776, Technion-Israel Institute of Technology, Haifa, Israel, August, 2010, which are incorporated herein by reference.

SUMMARY OF THE INVENTION

An embodiment that is described herein provides a switch, including multiple physical ports and forwarding circuitry. The multiple physical ports are configured to receive and send packets over a packet network. The forwarding circuitry is configured to assign respective first port numbers to the physical ports and to assign respective second port numbers to one or more temporary ports defined in addition to the physical ports. The forwarding circuitry is further configured to receive a packet having a destination address via a physical port of the switch, to select, based on the destination address, an egress port number for the packet from among the first and second port numbers, to forward the packet to a physical port corresponding to the egress port number if the egress port number is one of the first port numbers, and, if the egress port number is one of the second port numbers, to map a temporary port associated with the egress port number to a mapped physical port and to forward the packet to the mapped physical port.

In some embodiments, the switch connects to a first number of parent switches, and further connects to a second number of child switches or end-nodes, in a Fat-Tree network using the physical ports, and the forwarding circuitry is configured to assign the second port numbers based on a difference between the first number and the second number. In other embodiments, the switch resides in a given level of the Fat-Tree network, and the forwarding circuitry is configured to select the egress port number based at least on the given level. In yet other embodiments, the forwarding circuitry is configured to select the egress port number by applying a bit-group extraction operation to the destination address.

In an embodiment, in response to receiving an indication that sending packets via the physical port to which the temporary port is mapped fails, the forwarding circuitry is configured to map the temporary port to an alternative, operative physical port. In another embodiment, the physical ports are connected to the network via output interfaces of the switch having respective interface numbers ordered in an order permutation of the first numbers, and the forwarding circuitry is configured to map the temporary port to a physical port that connects to an output interface having an interface number equal to a first number associated with the mapped physical port.

In some embodiments, the switch further includes a fallback forwarding database (FDB), and the forwarding circuitry is configured to select the egress port number by applying to the destination address a bit-group extraction operation, and in response to detecting that the result of the bit-group extraction operation is invalid, to select the egress port number using the fallback FDB. In other embodiments, the forwarding circuitry is configured to select the egress port by extracting a bit-group including one or more bits of the destination address.

There is additionally provided, in accordance with an embodiment that is described herein a method including, in a switch that includes multiple physical ports that receive and send packets over a packet network, assigning respective first port numbers to the physical ports, and assigning respective second port numbers to one or more temporary ports defined in addition to the physical ports. A packet having a destination address is received via a physical port of the switch, and based on the destination address an egress port number for the packet is selected from among the first and second port numbers. The packet is forwarded to a physical port corresponding to the egress port number if the egress port number is one of the first port numbers, and, if the egress port number is one of the second port numbers, a temporary port associated with the egress port number is mapped to a mapped physical port and the packet is forwarded to the mapped physical port.

There is additionally provided, in accordance with an embodiment that is described herein, a packet network including one or more non-leaf switches and multiple leaf switches, which are connected to the non-leaf switches and are also connected to end-nodes that are assigned non-contiguous addresses. At least one of the leaf switches is connected to a respective number of end-nodes and is configured to receive a packet from a first end-node that is destined to a second end-node having a destination address, and to select a port via which to forward the packet, by extracting from the destination address a group of one or more bits representing an integer in a range determined by the number of end-nodes.

There is additionally provided, in accordance with an embodiment that is described herein, a method including, in a packet network that includes multiple leaf switches and one or more non-leaf switches, each of the leaf switches connects to a respective number of end-nodes, assigning non-contiguous addresses to the end-nodes attached to the leaf switches. A packet from a first end-node that is destined to a second end-node having a destination address is received in one of the leaf switches. A port of the one of the leaf switches, via which to forward the packet, is selected by extracting from the destination address a group of one or more bits representing an integer in a range determined by the number of end-nodes.

The present invention will be more fully understood from the following detailed description of the embodiments thereof, taken together with the drawings in which:

DETAILED DESCRIPTION OF EMBODIMENTS

Overview

A Fat-Tree network is a type of packet network comprising multiple switches that are arranged in one or more levels and interconnected in a tree-like structure. Compute nodes (also referred to as end-nodes) communicating over the Fat-Tree network connect directly to switches at the lowest level of the tree, referred to as leaf switches. Switches at higher levels interconnect with one another in accordance with the Fat-Tree topology, and are referred to as spine switches when having no connections to upper level switches, or intermediate switches when having connections to both upper and lower level switches.

The switches connect to the network via interfaces that are also referred to as physical ports, or simply ports for brevity. A path or route between two compute nodes may comprise a single leaf switch, when both compute nodes connect to the same leaf switch, or two leaf switches plus one or more intermediate and/or spine switches when the two compute nodes connect to different leaf switches.

Embodiments of the present invention that are described herein provide improved methods and systems for packet routing in Fat-Tree networks. In principle, each of the switches in the Fat-Tree network can hold a forwarding database (FDB) that defines an interconnection scheme among the ingress and egress ports of the switch. Using a FDB, however, has mainly two drawbacks. First, FDBs tend to consume a large storage space, and second, the processing latency of FDBs is typically long, which reduces the traffic bandwidth provided by the Fat-Tree network. In addition, in networks managed by a central entity, such as InfiniBand networks, configuring the FDBs of some or all of the network switches, e.g., at initialization or upon failure, typically takes a long time, during which the network is not fully functional.

In the disclosed techniques, packet forwarding is carried out by applying bit-group extraction operations to the destination address of the compute node to which the packet is destined. The disclosed techniques are applicable, for example, to switches in the Fat-Tree network that may have a different respective number of connections to upper and lower levels.

In the context of the present disclosure and in the claims, the term "bit-group extraction operation" refers to isolating from a multi-bit value one or more consecutive bits.

In some embodiments, the switch defines one or more temporary ports, in addition to the physical ports. The number of temporary ports depends on the difference between the number of connections to upper-level switches (parent switches) and the number of connections to lower-level switches (child switches) or compute nodes. The switch assigns respective port numbers to the physical ports and additional port numbers to the temporary ports.

In an embodiment, in response to receiving a packet having a given destination address via a physical port of the switch, the switch selects, based on the given destination address, an intermediate port for the packet from among the physical and temporary ports. If the temporary port was selected from among the physical ports, the switch forwards the packet to the respective physical port. Otherwise, i.e., when the intermediate port is one of the temporary ports, the switch first maps the temporary port to one of the physical ports and then forwards the packet to the mapped physical port.

In some embodiments, selecting the temporary port comprises determining forwarding information including an up/down direction and a port number. The up/down direction indicates whether to forward the packet to an upper-level switch or to a lower-level switch or compute node, and the port number is associated with one of the physical or temporary ports. In an embodiment, determining the forwarding information involves applying bit-group extraction operations to the destination address, to the switch index within the level to which it belongs, or to both.

In the context of the present patent application, the term "modulo operation" refers to arithmetic operations such as: dividing by a first number, taking the remainder after dividing by a second number, and both dividing by a first number and taking the remainder after dividing the result of the first division by a second number. Alternatively or additionally, other modulo operations can also be used.

As an example, let an integer D represent a destination address, and let N1, N2 be integer numbers. The operation of the form [Floor(D/N1)]% N2 represents a general modulo operation, wherein the operator % N2 refers to the remainder after division by N2.

In an embodiment, the switch maps the temporary port to a physical port using a mapping table. In response to detecting a failing port to which the temporary port is mapped, the switch updates the table to map the temporary port to an alternative operative port until the failing port recovers. In an embodiment, the mapping table is implemented as two separate tables, i.e., one table for mapping to ports connected to upper-level switches, and another table for mapping to ports connected to lower-level switches or compute nodes.

In some embodiments, the physical ports are comprised in a die within the switch, which comprises additional output interfaces mounted on the switch housing. The output interfaces are assigned the same port numbers as the die physical ports but are connected at different port number ordering. In such embodiments, the mapping tables are configured so that the intermediate port is mapped to a physical port that connects to the correct output interface.

In some embodiments, the switch comprises both an algorithmic forwarding (AF) unit that derives forwarding information using bit-group extraction operations, and an FDB that alternatively provides forwarding information at longer latencies. Given a destination address, the switch first uses the AF unit to derive forwarding information for the packet. If the AF unit fails to derive valid forwarding information, the switch uses the FDB as fallback to derive the forwarding information.

In Fat-Tree networks, the compute node addresses are conventionally assigned in a contiguous range of integers. In addition, the addresses assigned to the compute nodes that connect to a leaf switch, typically form a sequence of integers. Applying bit-group extraction operations to destination addresses in such schemes may result in complex and high latency implementations, e.g., when the leaf switch connects to a number of compute nodes that is not a power of two.

In some disclosed embodiments, the compute nodes are assigned addresses in a non-contiguous integer range. More specifically, one node connected to a given switch is assigned an integer number that is a power of two, and the other nodes connected to the same switch are assigned respective subsequent integers. By using such an assignment scheme, a port via which to forward a packet is selected by extracting a relevant bit-group from the destination address. A bit-group extraction operation typically involves shift and binary mask operations that incur much less complexity and latency compared to using the contiguous address range and conventional modulo operations.

System Description

Figure 1:
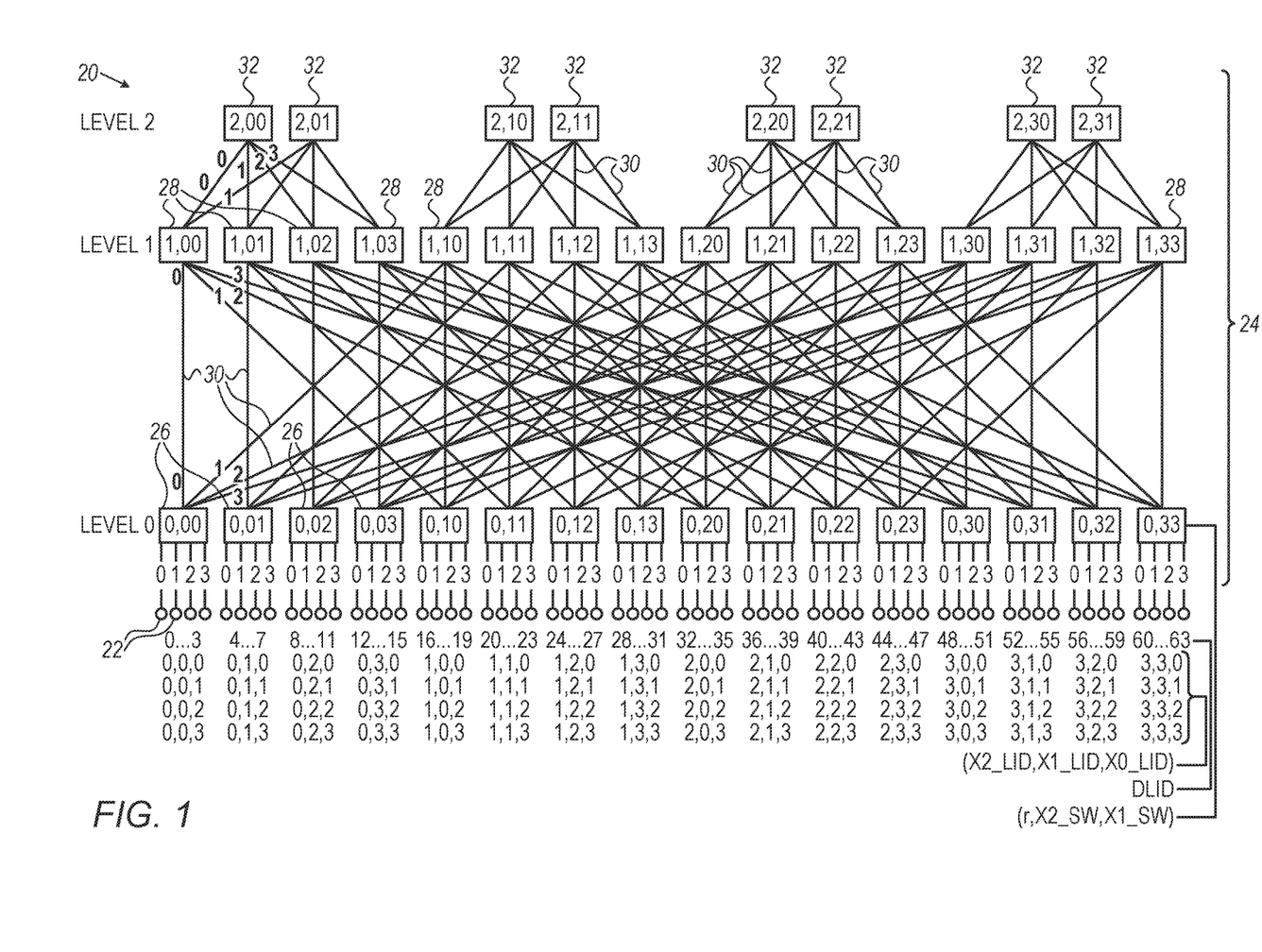
FIG. 1 is a block diagram that schematically illustrates a computing system using a Fat-Tree network, in accordance with an embodiment that is described herein.

FIG. 1 is a block diagram that schematically illustrates a computing system 20 using a Fat-Tree network 24, in accordance with an embodiment that is described herein. Each of compute nodes 22 typically comprises one or more processors with local memory and a communication interface (not shown), as are known in the art. Network 24 comprises a packet network such as an InfiniBand™ or Ethernet switch fabric. In the example of FIG. 1, sixty-four compute nodes interconnect via Fat-Tree network 24. The disclosed techniques, however, are equally applicable to large-scale clusters in which Fat-Tree networks interconnect hundreds and even thousands of compute nodes.

Network 24 comprises leaf switches 26, at the edge of the network, which connect directly to compute nodes 22. Network 24 further comprises intermediate switches 28 and spine switches 32, through which the leaf switches are interconnected. The leaf, intermediate and spine switches are connected by links 30 in a Fat-Tree topology. The compute nodes and switches are collectively referred to herein as "network elements."

The leaf, intermediate and spine switches in Fat-Tree network 24 are organized in three levels. The lowest level #0 occupies leaf switches 26, the middle level #1 occupies intermediate switches 28 and the upper level #2 occupies spine switches 32. In the present example, each leaf switch 26 connects to four compute nodes and to four intermediate switches at level #1. In addition, each intermediate switch 28 at level #1 connects to four leaf switches at level #0 and to two spine switches at level #2. Each spine switch 32 at level #2 connects to four intermediate switches at level #1. Network elements that connect to a switch at a lower level are referred to herein as "parent network elements" or "parents" for brevity. Similarly, network elements that connect to a switch at a higher level are referred to herein as "child network elements" or "children" for brevity.

In the context of the present disclosure and in the claims, the term "non-leaf switch" refers both to intermediate switches 28 and to spine switches 32. In other words, a non-leaf switch may comprise an intermediate switch or a spine switch.

In system 20, each network element is assigned a unique identifier. In the present example, system 20 interconnects sixty-four compute nodes 22 that each is assigned a unique node address in the range 0 . . . 63. In InfiniBand terminology the node identifier is denoted destination local ID (DLID). In the description that follows the terms "node address" and "DLID" are used interchangeably. Each node address in the range 0 . . . 63 can be represented as a combination of three digits X2_LID, X1_LID and X0_LID, each digit comprises an integer in the range 0 . . . 3, and the address is given by $DLID=X0+4 \cdot X1+4^2 \cdot X2$. For example, DLID=1 is represented as (0, 0, 1) and DLID=54 as (3, 1, 2).

Each of the switches in network 24 is assigned a three-digit identifier (r, X2_SW, X1_SW), wherein r=0, 1, 2 denotes the level to which the switch belongs, and X2_SW and X1_SW are digits in the range 0 . . . 3 that jointly identify the switch index within the level to which it belongs. In FIG. 1, for the sake of clarity, the switch digits X2_SW and X1_SW are not separated by a comma. For example, switch (0, 0, 1), i.e., (0, 01) in the figure, is the second switch at level #0, and switch (1, 0, 3) is the fourth switch at level #1, wherein counting starts from the left. In the example network 24, the switch index is defined as SW_INDEX=X1_SW+4*X2_SW.

In network 24, switches at levels #0 and #1 that share the same X1_SW value, and switches at levels #1 and #2 that share the same X2_SW value, are interconnected. For example, switch (0, 0, <u>1</u>) at level #0 connects to switches (1, 0, <u>1</u>), (1, 1, <u>1</u>), (1, 2, <u>1</u>) and (1, 3, <u>1</u>) at level #1. Similarly, switch (1, 3, <u>2</u>) at level #1 connects to switches (0, 0, <u>2</u>), (0, 1, <u>2</u>), (0, 2, <u>2</u>) and (0, 3, <u>2</u>) at level #0. As another example, switch (1, <u>2</u>, 3) at level #1 connects to switches (2, <u>2</u>, 0) and (2, <u>2</u>, 1) at level #2, and switch (2, <u>2</u>, 0) at level #2 connects to switches (1, <u>2</u>, 0), (1, <u>2</u>, 1), (1, <u>2</u>, 2), and (1, <u>2</u>, 3) at level #1.

Packets sent from a compute node to a given switch at level #0 can be delivered to a destination node connected to another switch at level #0 via several different routes. For example, switch (0, 0, 1) can deliver packets to and receive packets from switch (0, 1, 1) via four different routes:

(0, 0, 1)<->(1, 0, 1)<->(0, 1, 1)<->nodes 20 . . . 23
    (0, 0, 1)<->(1, 1, 1)<->(0, 1, 1)<->nodes 20 . . . 23
    (0, 0, 1)<->(1, 2, 1)<->(0, 1, 1)<->nodes 20 . . . 23
    (0, 0, 1)<->(1, 3, 1)<->(0, 1, 1)<->nodes 20 . . . 23

In the above example, a node 4, 5, 6 or 7 connected to switch (0, 0, 1) can send packets to each of nodes 20, 21, 22 and 23 via one of the four available routes. As will be described below, the disclosed forwarding techniques result in even traffic distribution via alternative routes in network 24.

The Fat-Tree configuration in FIG. 1 is given by way of example, and other suitable Fat-Tree configurations can also be used. For example, alternative suitable Fat-Tree networks may comprise different numbers of tree levels, switches per level and compute nodes per leaf switch. In addition, other Fat-Tree topologies having interconnection schemes other than the interconnection scheme of network 24 can be used. The unique identifiers assigned to the network elements in network 24 are not mandatory and in alternative embodiments other suitable identifiers can also be used. Although the Fat-Tree comprises one level of intermediate switches (level #1), in other embodiments, the Fat-Tree may comprise multiple intermediate levels, or alternatively the Fat-Tree may comprises only a leaf level and a spine level.

Figure 2:
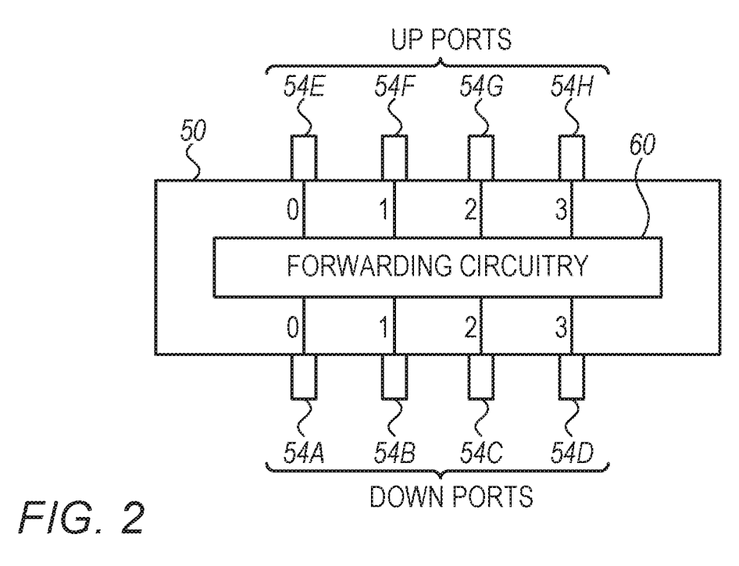
FIG. 2 is a block diagram that schematically illustrates a network switch that forwards packets using algorithmic forwarding techniques, in accordance with an embodiment that is described herein.

FIG. 2 is a block diagram that schematically illustrates a network switch 50 that forwards packets using algorithmic forwarding techniques, in accordance with an embodiment that is described herein. Switch 50 can serve, for example, as a leaf switch 26, as an intermediate switch 28 or as a spine switch 32 in Fat-Tree network 24 of FIG. 1.

Switch 50 comprises multiple interfaces 54 through which the switch connects to the network. Each interface 54 comprises a physical port that connects mechanically and electrically via a link 30 to another switch in the network or to a compute node. Each of interfaces 54 functions as an ingress port that receives packets from the network and as an egress port that delivers packets to the network. Interfaces 54 are also referred to as physical ports, or simply ports, for brevity.

When used in a Fat-Tree network such as network 24, some of ports 54 connect to child network elements, i.e., switches or compute nodes at a lower level, whereas other ports 54 connect to parent network elements, i.e., switches at a higher level. A port 54 that connects to a parent network element is referred to herein as an "up-port", and a port that connects to a child network element is referred to herein as a "down-port."

Switch 50 is typically configured during initialization of network 24. The switch configuration parameters include, for example, the level to which the switch belongs and the switch index within that level. Other configuration parameters may include port assignment to up-ports and down-ports and port numbering. In the example switch of FIG. 2, ports 54A . . . 54D are configured as down-ports and are assigned respective port numbers 0 . . . 3. Similarly, ports 54E . . . 54H are configured as up-ports and are assigned respective port numbers 0 . . . 3. In alternative embodiments, other suitable port assignment and numbering can also be used.

When located at level #0, each of down-ports 54A . . . 54D of the switch connects to a respective compute node, and each of up-ports 54E . . . 54H connects to a respective parent switch at level #1. When located at level #1, each of down-ports 54A . . . 54D of the switch connects to a respective child switch at level #0, and each of up-ports 54E and 54F connect to a respective parent switch at level #1. In the example of network 24, up-ports 54G and 54H of the switches at level #1 are unused. When switch 50 is positioned at level #2 of network 24, down-ports 54A . . . 54D connect to respective child switches at level #1. Since level #2 is the uppermost level, up-ports 54E . . . 54H of the level #2 switches are unused.

Switch 50 further comprises forwarding circuitry 60, which forwards packets among ports 54. Forwarding circuitry 60 receives a packet via a given port and delivers the packet to the network via a different port. The forwarding circuitry of switch 50 forwards packets received via a down-port to either an up-port or to another down-port. The forwarding circuitry additionally forwards packets received via an up-port to a down-port.

Given a packet destined to some compute node having a respective node address (or DLID), forwarding circuitry 60 selects an egress port using algorithmic forwarding techniques that are based on applying bit-group extraction operations to the DLID. Example algorithmic forwarding methods are described in detail below. In some embodiments, selecting an egress port also depends on at least one of the level to which the switch belongs, the switch index within that level and the respective numbers of up-ports and down-ports actually connected or used.

As noted above, the switch comprises multiple interfaces 54 and forwarding circuitry 60. In the description that follows and in the claims, the term "forwarding circuitry" refers to all the elements of the switch excluding the interfaces.

Figure 3:
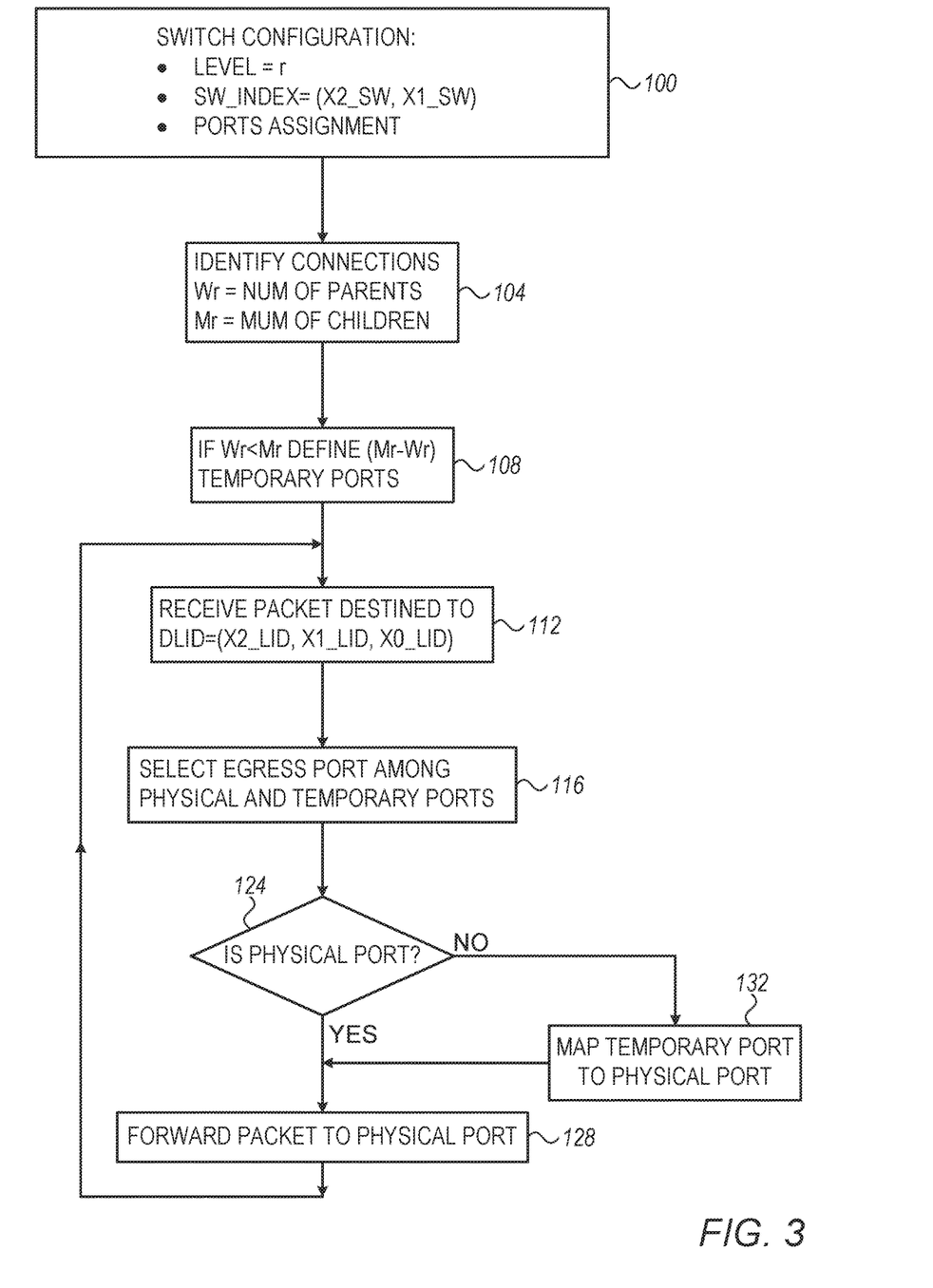
FIG. 3 is a flow chart that schematically illustrates a method for algorithmic forwarding, in accordance with an embodiment that is described herein.

FIG. 3 is a flow chart that schematically illustrates a method for algorithmic forwarding, in accordance with an embodiment that is described herein. The flow chart is described with reference to forwarding circuitry 60 of switch 50 located at level #1 of Fat-tree network 24 above.

At a configuration step 100, forwarding circuitry 60 configures switch parameters that are related to the switch connectivity within the network. In some embodiments, the configuration includes the level r of the Fat-Tree in which the switch is located and the switch index within that level. The configuration additionally includes assignment of ports 54 as up-ports and down-ports, and assigning respective port numbers to the up-ports and down ports. In Fat-Tree network 24, at level #1 the down-ports and up-ports are assigned, for example, port numbers in the ranges 0, 1, 2, 3, and 0, 1, respectively. In alternative embodiments, the entire physical ports are assigned port numbers in the range 0 . . . 5, or any other suitable assignment.

At a connections identification step 104, the circuitry identifies the number Wr of parent switches connected to the up-ports, and the number Mr of child switches or compute nodes connected to the down-ports. At a temporary ports definition step 108, the forwarding circuitry compares between Wr and Mr. If the number of parent network elements is smaller than the number of child network elements, the forwarding circuitry defines a number of (Mr−Wr) temporary ports, and assigns to these temporary ports respective port numbers other than the port numbers already assigned to the physical up-ports. In the example above, the up-ports were assigned port numbers 0, 1 and the temporary ports are assigned port numbers 2, 3.

At a reception step 112, the forwarding circuitry accepts a packet that was received via one of the physical up-ports or down-ports. The received packet is destined to a compute node having a node address DLID=(X2_LID,X1_LID, X0_LID). At a selection step 116, the circuitry selects an egress port among the physical and temporary ports. Selecting the egress port comprises selecting a forwarding direction, i.e., whether to forward the packet via an up-port or down-port, and determining the respective port number. In an embodiment, the forwarding circuitry selects an egress port based on the forwarding rules depicted in Table 1 below.

TABLE 1

Forwarding rules

| Level | Check condition | Select when condition is true | Select when condition is false |
|---|---|---|---|
| #0 | X2_LID==X2_SW AND X1_LID==X1_SW | DOWN_PORT X0_LID | UP_PORT X0_LID |
| #1 | X1_LID==X1_SW | DOWN_PORT X2_LID | UP_PORT X1_LID |
| #2 | No Check | DOWN_PORT X1_LID | NA |

In Table 1, the port number of the selected egress port equals the value of one of the DLID digits X0_LID, X1_LID or X2_LID.

In some embodiments, instead of applying a modulo operation to the destination address, the forwarding circuitry extracts from the destination address (or from the switch index) a group of one or more bits that represent the integer value of the relevant digit. The operation of bit-group extraction can be implemented efficiently, e.g., in hardware, by applying a bit-masking operation, or by applying a bit-shifting operation followed by a bit-masking operation.

At a checking step 124, the circuitry checks whether the port number of the egress port selected is associated with a physical port or a temporary port. If the port number of the selected egress port is 0 or 1, the egress port is associated with a physical port and the circuitry forwards the packet via the relevant physical port 0 or 1. Otherwise, the egress port is associated with one of the temporary ports 2 and 3, and the circuitry proceeds to a mapping step 132 for mapping the temporary port to a physical port.

The forwarding circuitry may carry out the mapping at step 132 using any suitable method. In an example embodiment, the forwarding circuitry uses a mapping table that maps, in the present example, temporary ports 2 and 3 to physical ports 0 and 1, respectively. In an alternative embodiment, the forwarding circuitry maps the temporary port number to a physical port number by dividing the temporary port number by (Mr/Wr), i.e., by two in the present example. Following step 132, the circuitry proceeds to a delivery step 128 to forward the packet via the mapped physical port. After forwarding the packet at step 128 the circuitry loops back to step 112 to receive subsequent packets.

The method of FIG. 3 is given by way of example, and in alternative embodiments other suitable methods can also be used. For example, the forwarding rules given in Table 1, result in even traffic distribution in Fat-Tree network 24. In other Fat-tree topologies, other forwarding rules can also be used. As another example, in FIG. 3, the number Wr=2 of parent network elements connected to respective up-ports is smaller than the number of child elements Mr=4 connected to respective down-ports of the switch, and therefore the forwarding circuitry defines Mr−Wr=2 temporary up-ports. In other levels of Fat-Tree network 24, or in other Fat-tree configurations, the forwarding circuitry selects another number of temporary ports, or none temporary ports, depending on the number of parent and child network elements.

Implementation of Forwarding Circuitry in Hardware

Figure 4:
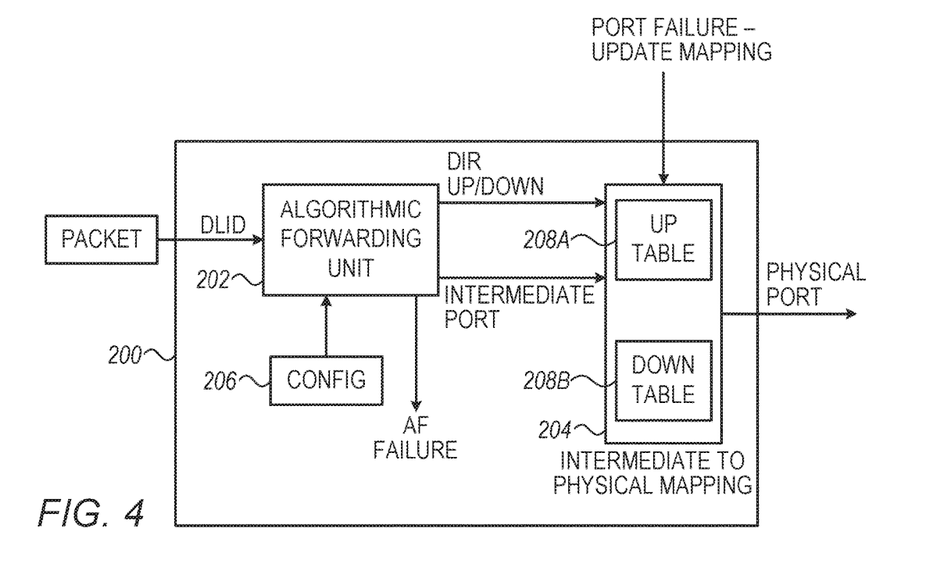
FIGS. 4 and 5 are block diagrams that schematically illustrate forwarding circuitry implemented in hardware, in accordance with embodiments that are described herein.
Figure 5:
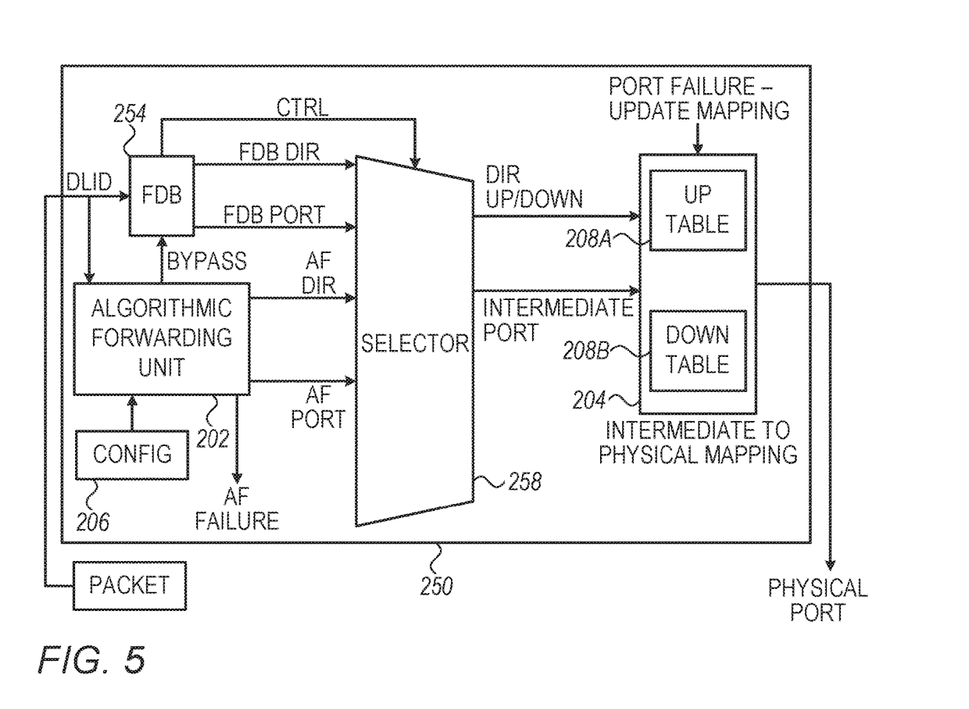

FIGS. 4 and 5 are block diagrams that schematically illustrate forwarding circuitry 200 and 250 implemented in hardware, in accordance with embodiments that is described herein. In the description that follows we assume that forwarding circuitry 200 or 250 implements forwarding circuitry 60 of switch 50 of FIG. 2, and that switch 50 may be any of the switches of Fat-Tree network 24 of FIG. 1.

In FIG. 4, forwarding circuitry 200 comprises an algorithmic forwarding (AF) unit 202, a mapping unit 204 and a configuration module 206. Configuration module 206 is initialized (typically at network setup) with configuration parameters that are required for carrying out the AF tasks. In some embodiments, the configuration parameters include the level in the Fat-Tree to which the switch belongs and the switch index within that level.

In an embodiment, the configuration module additionally stores port assignment information such as division of the physical ports to up-ports and down-ports, definition of temporary ports when the number of parent network elements is different from the number of child network elements, and assignment of port numbers to the physical and temporary ports. Example configuration process is described, for example, at steps 100, 104 and 108 of the method of FIG. 3 above.

AF unit 202 receives from a physical port of the switch a packet having a DLID field that indicates the packet's destination address. Based on the DLID and the parameters configured, the AF unit selects an intermediate port among the physical and temporary ports. In particular, AF unit 202 decides whether to deliver the packet via an up-port or a down-port, and selects one of the physical or temporary ports as an intermediate selection.

For example, consider a switch having 36 ports of which 24 ports are configured as down-ports and 12 as up-ports. In this example, AF unit 202 defines 12 (i.e., 36−24) temporary up-ports. The AF unit selects an intermediate port in this case among 48 ports comprising the 36 physical ports as well as the 12 temporary ports. Alternatively, the AF unit may select the intermediate port only among the 12 physical up-ports and 12 temporary ports when deciding on the up direction, or among the 24 physical down-ports when deciding on the down direction. An up/down direction and a port number are collectively referred to herein as "forwarding information."

Mapping unit 204 receives from AF unit 202 an indication of the up/down direction and the port number of the selected intermediate port. In an embodiment, mapping unit 204 comprises separate mapping tables 208A and 208B for mapping the intermediate port to an up-port or to a down-port, respectively. In the example 36-port switch described above, table 208A comprises 24 entries for mapping in the up direction. Intermediate port in the range 0 . . . 11 is mapped to a respective physical up-port in the same range 0 . . . 11. Intermediate ports in the range 12 . . . 23 are temporary ports that are also mapped to up-ports in the range 0 . . . 11. In an embodiment, a temporary port number 12+i is mapped to a physical up-port number i. Table 208B maps intermediate port numbers 0 . . . 23 to physical down-ports 0 . . . 23.

In some embodiments, the forwarding circuitry is comprised in an integrated circuit (IC) or a die, and the switch comprises a housing that contains the forwarding circuitry. The physical ports of the forwarding circuitry are connected to output interfaces mounted on the switch housing. In some embodiments, the output interfaces are assigned the same port numbers as the physical ports of the circuit, but the output interfaces are connected to the physical ports at a different ordering or permutation of the port numbers. For example, physical port 2 in the forwarding circuit may connect to output interface 0 mounted on the switch housing.

In such embodiments, the mapping in tables 208A and 208B includes mapping the intermediate port number to a physical port number of the die, and mapping the physical port number to the output interface number. The mapping thus includes an ordering permutation in accordance with the physical ports to output interfaces interconnections. For example, if an intermediate port should be mapped to output interface 0, which is wired to physical port 2 in the circuit, then the tables map the intermediate port to physical port 2 and not to physical port 0. In these embodiments, each of tables 208A and 208B has a number of entries equal to the total number of physical ports, e.g., 36 entries per table in the example 36-port switch described above.

In some embodiments, forwarding circuitry receives, from the switch, an indication of a failing physical port or link. In response to receiving a failure indication, the forwarding circuitry updates mapping tables 208A and 208B to forward the intermediate port that is currently mapped to the failing physical port to an alternative operative port. When the failing port recovers, the forwarding circuitry re-maps the intermediate port to the recovered port.

In some situations, AF unit 202 may fail to carry out the forwarding process. An AF failure may occur, for example, when a switch in the network is not connected in accordance with the underlying Fat-Tree topology, or when the switch is configured with wrong parameters. A DLID that is outside the valid DLID range defined for the underlying network topology can also cause an AF failure.

In some embodiments, when the AF fails, the packet in question is discarded. In other embodiments, one of the physical ports is configured as a fallback port to which packets are forwarded when another port or link fails. This fallback port can be used also in case of AF failure. In yet other embodiments a fallback FDB is used, as detailed in FIG. 5, below.

Forwarding circuitry 250 in FIG. 5 is similar to forwarding circuitry 200 but additionally provides fault tolerance operation. Forwarding circuitry 250 comprises AF unit 202, mapping unit 204, and configuration module 206 that function similarly to forwarding circuitry 200 of FIG. 4. Forwarding circuitry 250 further comprises a forwarding database (FDB) 254, and a selector 258. The processing latency incurred by FDB 254 is typically much longer than the processing latency incurred by AF unit 202, and therefore AF unit 202 should operate at a higher priority, and FDB 254 should be used when AF unit 202 is unable to derive forwarding information.

As noted above, AF unit 202 selects an intermediate port among the physical ports and defined temporary ports (if any). In contrast, FDB 254 selects an intermediate port only among the physical ports of the switch and is unaware of the temporary ports defined in the AF unit.

Both AF unit 202 and FDB 254 receive the packet destination address or DLID. The AF unit first attempts to derive AF forwarding information as described above, and if the AF unit succeeds, selector 258 outputs the AF information. Upon failure, the AF unit signals to the FDB to generate FDB forwarding information, including an up/down direction indication and an intermediate port. When the FDB forwarding information becomes available, FDB 254 signals selector 258 to output the FDB forwarding information instead of the AF forwarding information.

Assignment of Non-Contiguous Node Addresses

Typically, the nodes connected to a given leaf switch are assigned node addresses in a contiguous sequence of integers. For example, in FIG. 1, nodes 0 . . . 3 connect to switch (0, 0, 0), nodes 4 . . . 7 connect to switch (0, 0, 1), and so on. The node addresses interconnected using the network thus form a contiguous range of integers 0 . . . 63.

Consider, for example, a 36-port switch having 18 up-ports and 18 down-ports. In a Fat-Tree network built from such ports, each leaf port connects to 18 compute nodes, which are conventionally assigned addresses in the ranges 0 . . . 17, 18 . . . 35 and so on. Forwarding a packet having a given DLID based on modulo operations, requires to apply to the DLID modulo by 18 operations such as, for example, DLID %18, and (DLID/18)%18 operations. Such modulo operations are complex to implement and incur long processing latency.

In the disclosed embodiments, the DLIDs of the compute nodes are assigned in a non-contiguous integer range. As a result, instead of applying high complexity modulo operations by the number of nodes per switch, the switches apply bit-group extraction operations, resulting in much lower complexity and latency.

Assigning the DLIDs and defining the respective bit-group extraction operations can be carried out in various ways. In an example embodiment, the sequence of DLIDs assigned to a given switch starts with an integer that is a power of two. In the example 36-port switch, the DLIDs are assigned as follows: (0 . . . 17), (32 . . . 32+17), (64 . . . 64+17) to the first, second and third leaf switches, respectively. Applying the bit-group extraction operation is carried out using shift and/or binary mask operations. In the present example, the extracted bit-group represents an integer in the range 0 . . . 17.

In some embodiments, the DLID space is limited, and the network requires the usage of at least some the DLIDs that fall outside the non-contiguous sequence of DLIDs, such as 18 . . . 31 and 50 . . . 63 in the example described above. In such embodiments, the switch comprises both an AF unit and a FDB, such as in forwarding circuitry 250 of FIG. 5. The AF unit derives forwarding information for the DLIDs that fall in the non-contiguous DLID sequence, and the FDB derives forwarding information for those DLIDs that fall outside the non-contiguous DLID sequence.

The switch configurations depicted in FIGS. 2 and 4 are example configurations, which are chosen purely for the sake of conceptual clarity. In alternative embodiments, any other suitable switch configuration can also be used. For example, although the embodiments described herein refer mainly to switches, the disclosed techniques can be implemented in various other types of network elements such as network routers.

Certain switch elements may be implemented using hardware/firmware, such as using one or more Application-Specific Integrated Circuits (ASICs) or Field-Programmable Gate Arrays (FPGAs). Alternatively, some switch elements may be implemented in software or using a combination of hardware/firmware and software elements.

In some embodiments, certain switch functions, such as certain functions of forwarding circuitry 60 or AF unit 202, may be implemented using a processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A switch, comprising:
   multiple physical ports, which are configured to receive and send packets over a packet network, the physical ports comprising an up-number of physical ports via which the switch connects to parent switches and a down-number of physical ports via which the switch connects to child switches or end-nodes, wherein a number of the child switches or end-nodes is larger than a number of the parent switches; and forwarding circuitry, which is configured to:

compare between the down-number and the up-number, and when the down-number is larger than the up-number, define one or more nonphysical temporary ports in addition to the physical ports, wherein a number of the nonphysical temporary ports equals a difference calculated as the down-number minus the up-number;

assign respective first port numbers to the physical ports, and assign respective second port numbers, different from the first port numbers, to the nonphysical temporary ports;

receive a packet having a destination address via a physical port of the switch and select, based on a comparison between a subset of bits defining the destination address, and bits defining an identifier of the switch, an intermediate port for the packet from among both the physical ports and the nonphysical temporary ports; and forward the received packet to a physical port corresponding to the intermediate port if the intermediate port is one of the physical ports, and, if the intermediate port is one of the nonphysical temporary ports, map the intermediate port to a mapped physical port, based on the first and second port numbers, and forward the received packet to the mapped physical port.

2. The switch according to claim 1, wherein the switch connects to a first number of parent switches that is equal to or smaller than the up-number, and further connects to a second number of child switches or end-nodes that is equal to or smaller than the down-number, in a Fat-Tree network using the physical ports, and wherein the forwarding circuitry is configured to assign the second port numbers based on a difference between the first number and the second number.

3. The switch according to claim 2, wherein the switch resides in a given level of the Fat-Tree network, and wherein the forwarding circuitry is configured to select the intermediate port based at least on the given level.

4. The switch according to claim 1, wherein the forwarding circuitry is configured to select the intermediate port by applying a bit-group extraction operation to the destination address.

5. The switch according to claim 1, wherein in response to receiving an indication that sending packets via the physical port to which the intermediate port is mapped fails, the forwarding circuitry is configured to map the intermediate port to an alternative, operative physical port.

6. The switch according to claim 1, wherein the physical ports are connected to the network via output interfaces of the switch having respective interface numbers, wherein the interface numbers are an order permutation of the first port numbers, and wherein the forwarding circuitry is configured to map the intermediate port to a physical port that connects to an output interface having an interface number equal to a first port number associated with the mapped physical port.

7. The switch according to claim 1, wherein the switch further comprises a fallback forwarding database (FDB), wherein the forwarding circuitry is configured to select the intermediate port by applying to the destination address a bit-group extraction operation, and in response to detecting that a result of the bit-group extraction operation is invalid, to select the intermediate port using the fallback FDB.

8. The switch according to claim 1, wherein the forwarding circuitry is configured to select the intermediate port by extracting a bit-group comprising one or more bits of the destination address.

9. A method, comprising:

in a switch that comprises multiple physical ports that receive and send packets over a packet network, wherein the physical ports comprising an up-number of physical ports via which the switch connects to parent switches and a down-number of physical ports via which the switch connects to child switches or end-nodes, wherein a number of the child switches or end-nodes is larger than a number of the parent switches, comparing between the down-number and the up-number, and when the down-number is larger than the up-number, defining one or more nonphysical temporary ports in addition to the physical ports, wherein a number of the nonphysical temporary ports equals a difference calculated as the down-number minus the up-number;

assigning respective first port numbers to the physical ports, and assigning respective second port numbers, different from the first port numbers, to the nonphysical temporary ports;

receiving a packet having a destination address via a physical port of the switch, and selecting, based on a comparison between a subset of bits defining the destination address, and bits defining an identifier of the switch, an intermediate port for the packet from among both the physical ports and the nonphysical temporary ports; and forwarding the received packet to a physical port corresponding to the intermediate port if the intermediate port is one of the physical ports, and, if the intermediate port is one of the nonphysical temporary ports, mapping intermediate port to a mapped physical port, based on the first and second port numbers, and forwarding the received packet to the mapped physical port.

10. The method according to claim 9, wherein the switch connects to a first number of parent switches that is equal to or smaller than the up-number, and further connects to a second number of child switches or end-nodes that is equal to or smaller than the down-number, in a Fat-Tree network using the physical ports, and wherein assigning the second port numbers comprises setting the second port numbers based on a difference between the first number and the second number.

11. The method according to claim 10, wherein the switch resides in a given level of the Fat-Tree network, and wherein selecting the intermediate port comprises choosing the intermediate port based at least on the given level.

12. The method according to claim 9, wherein selecting the intermediate port comprises choosing the intermediate port by applying a bit-group extraction operation to the destination address.

13. The method according to claim 9, and comprising, in response to receiving an indication that sending packets via the physical port to which the intermediate port is mapped fails, mapping the intermediate port to an alternative, operative physical port.

14. The method according to claim 9, wherein the physical ports are connected to the network via output interfaces of the switch having respective interface numbers, wherein the interface numbers are an order permutation of the first port numbers, and wherein mapping the intermediate port comprises mapping the intermediate port to a physical port that connects to an output interface having an interface number equal to a first port number associated with the mapped physical port.

15. The method according to claim 9, wherein the switch further comprises a fallback forwarding database (FDB), wherein selecting the intermediate port comprises applying to the destination address a bit-group extraction operation, and, in response to detecting that a result of the bit-group extraction operation is invalid, selecting the intermediate port using the fallback FDB.

16. The method to claim 9, wherein selecting the intermediate port comprises extracting a bit-group comprising one or more bits of the destination address.

17. A switch, comprising:
multiple physical ports, which are configured to receive and send packets over a packet network, the physical ports comprising an up-number of physical ports via which the switch connects to parent switches and a down-number of physical ports via which the switch connects to child switches or end-nodes, wherein a number of the child switches or end-nodes is larger than or equal to a number of the parent switches; and
forwarding circuitry, which is configured to:
calculate a number of temporary ports as a difference of the down-number minus the up-number;
compare between the down-number and the up-number, and when the down-number is larger than the up-number, define one or more nonphysical temporary ports in addition to the physical ports;
assign respective first port numbers to the physical ports, and when the number of temporary ports is nonzero assign respective second port numbers, different from the first port numbers, to the nonphysical temporary ports;
receive a packet having a destination address via a physical port of the switch and select, based on a comparison between a subset of bits defining the destination address, and bits defining an identifier of the switch, an intermediate port for the packet from among the physical ports or when the number of temporary ports is nonzero from among both the physical ports and the nonphysical temporary ports; and
forward the received packet to a physical port corresponding to the intermediate port if the intermediate port is one of the physical ports, and, when the number of temporary ports is nonzero and the intermediate port is one of the nonphysical temporary ports, map the intermediate port to a mapped physical port, based on the first and second port numbers, and forward the received packet to the mapped physical port.

18. A method, comprising:
in a switch that comprises multiple physical ports that receive and send packets over a packet network, wherein the physical ports comprising an up-number of physical ports via which the switch connects to parent switches and a down-number of physical ports via which the switch connects to child switches or end-nodes, wherein a number of the child switches or end-nodes is larger than or equal to a number of the parent switches,
calculating a number of temporary ports as a difference of the down-number minus the up-number;
comparing between the down-number and the up-number, and when the down-number is larger than the up-number, defining one or more nonphysical temporary ports in addition to the physical ports;
assigning respective first port numbers to the physical ports, and when the number of temporary ports is nonzero assigning respective second port numbers, different from the first port numbers, to the nonphysical temporary ports;
receiving a packet having a destination address via a physical port of the switch, and selecting, based on a comparison between a subset of bits defining the destination address, and bits defining an identifier of the switch, an intermediate port for the packet from among the physical ports or when the number of temporary ports in nonzero from among both the physical ports and the nonphysical temporary ports; and
forwarding the received packet to a physical port corresponding to the intermediate port if the intermediate port is one of the physical ports, and, when the number of temporary ports is nonzero and the intermediate port is one of the nonphysical temporary ports, mapping the intermediate port to a mapped physical port, based on the first and second port numbers, and forwarding the received packet to the mapped physical port.

* * * * *